Dec. 17, 1968    O. STIER ET AL    3,416,394
SAWTOOTH TREATING APPARATUS
Filed June 12, 1967    8 Sheets-Sheet 1

INVENTORS
OTTO STIER
ERNST BECK
BY
ATTORNEYS

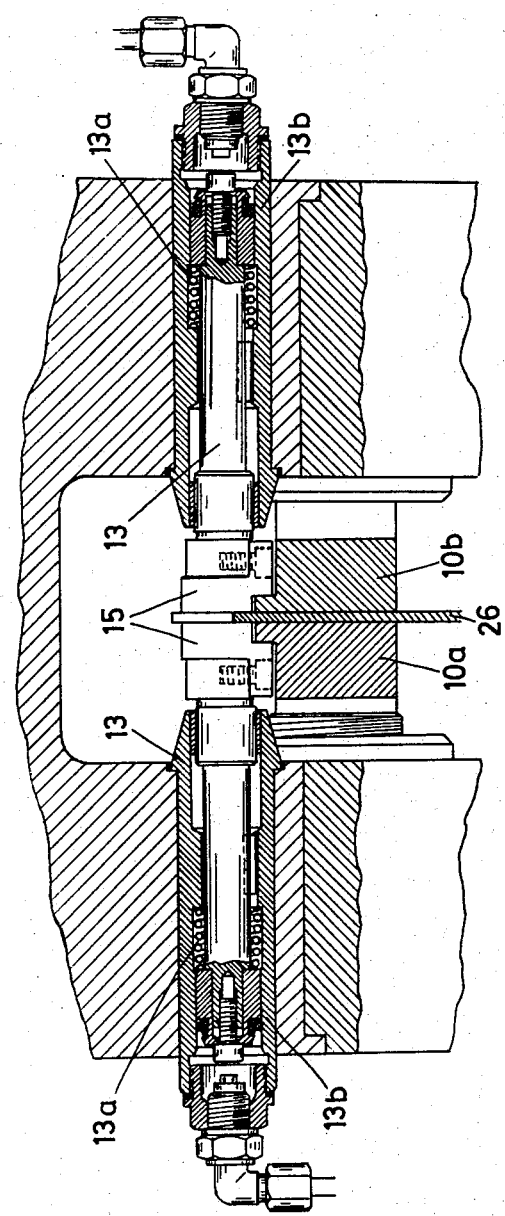

Dec. 17, 1968  O. STIER ET AL  3,416,394
SAWTOOTH TREATING APPARATUS

Filed June 12, 1967  8 Sheets-Sheet 6

INVENTORS:
OTTO STIER
ERNST BECK
BY
ATTORNEYS

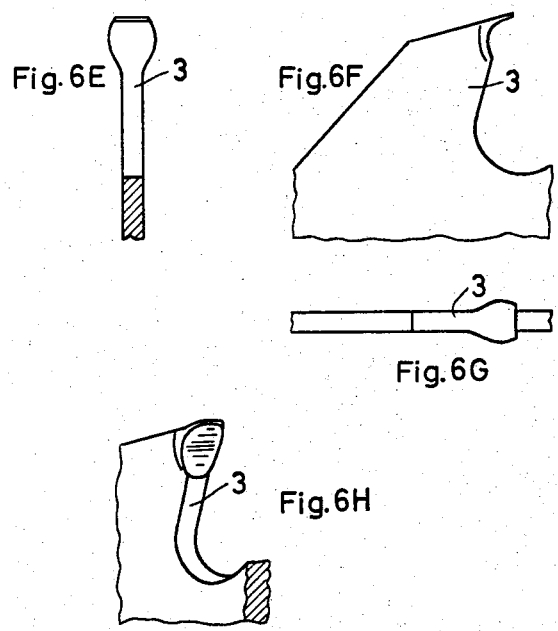

United States Patent Office 3,416,394
Patented Dec. 17, 1968

3,416,394
SAWTOOTH TREATING APPARATUS
Otto Stier and Ernst Beck, Biberach an der Riss, Germany, assignors to Vollmer Werke Maschinenfabrik G.m.b.H., Biberach an der Riss, Germany
Continuation-in-part of application Ser. No. 436,783, Mar. 3, 1965. This application June 12, 1967, Ser. No. 645,272
9 Claims. (Cl. 76—49)

ABSTRACT OF THE DISCLOSURE

A saw treating apparatus in which a rotary upsetting rod extends perpendicularly to a saw blade to engage a sawtooth thereof which is at a working station, the rotary upsetting rod engaging the cutting edge of the sawtooth to upset the sawtooth in the region of its cutting edge during rotary movement of this rod. A moving means is operatively connected with the rotary upsetting rod for moving the latter from a rest position into engagement with the cutting edge of the sawtooth, and a distributing means is provided for redistributing the material of the sawtooth which is upset by the upsetting rod. This distributing means has a rest position displaced from the working station, and the moving means is operatively connected to the distributing means to displace the latter to the working station from its rest position, this distributing means engaging the material which has been upset by the upsetting rod so as to redistribute the material while each tooth remains at the working station subsequent to the upsetting thereof by the upsetting rod.

Cross reference to related application

This application is a continuation-in-part of co-pending application Ser. No. 436,783, filed Mar. 3, 1965, and entitled, "Sawtooth Treating Apparatus," now abandoned.

Background of the invention

The present invention relates to apparatus for working on the teeth of saw blades. In particular, the present invention relates to that part of a sawtooth treating apparatus which upsets the tip of each sawtooth and distributes the material of the upset tip.

As is well known, in order to provide proper cutting with the teeth of a saw blade, it is necessary first to upset the material of a saw blade tooth at its cutting edge and adjacent the tip thereof, after which this upset material is redistributed so as to have a proper distribution for subsequent sharpening of the teeth of the saw blade.

With conventional apparatus for treating a saw blade in the above manner, the upsetting rod is required to enter into the space between a pair of successive teeth without engaging the tooth which is to be upset, so that initially the upsetting rod must be spaced from the tooth on which it is to work while during rotation of the upsetting rod it is required to reliably engage and upset the material of the tooth. Thus, the clearance between the upsetting rod and the tooth during movement of the upsetting rod into the gap between the pair of successive teeth is necessarily quite small, resulting in a requirement of extreme precision in the structure. Furthermore, with conventional structure the saw blade is clamped once while a tooth is acted upon by the upsetting rod, then this clamping action is released and the saw is displaced and clamped again in order to be acted upon by the material distributing jaws. As a result it is necessary for the saw blade to be clamped twice and released twice for each tooth, rendering the conventional structure extremely complex and expensive. Thus, a considerable disadvantage resides in the fact that the redistribution of the upset material must take place at a location different from that at which the upsetting itself takes place. Furthermore, with conventional structure the distributing jaws which redistribute the upsetting material provide small fins or burrs which must subsequently be removed, and this also is a serious disadvantage of the conventional saw treating structure.

Summary of the invention

It is a primary object of the present invention to provide an apparatus which will act on sawteeth to upset the material thereof and redistribute the upset material, while avoiding drawbacks of known apparatus designed for similar purposes.

More specifically, it is an object of the present invention to provide a structure which will upset the material of a sawtooth and redistribute the upset material while the sawtooth remains stationary at the same working station, but while at the same time redistributing the upset material with jaws which act only in compression on the upset material of the sawtooth.

Yet another object of the present invention is to provide an apparatus which can easily be adjusted to act on teeth which are situated at different distances from each other, even with sawblades where the gaps between the teeth are not uniform.

Furthermore, it is an object of the present invention to provide a structure which in a single operation will upset the material of a sawtooth and will then redistribute the upset material while guaranteeing a high degree of hardening of the sawtooth material.

Also, it is an object of the present invention to provide for a structure of the above type a means which will reliably maintain each sawtooth stationary while the material thereof is being upset.

Also, it is an object of the present invention to provide an exceedingly simple, rugged and relatively inexpensive structure which will accomplish the above objects in an efficient manner.

Furthermore, it is an object of the present invention to provide a construction which will subject a rotary upsetting rod to only a small degree of torsional stresses, so that for a given size of upsetting rod the extent to which material is upset can be relatively great.

Also, it is an object of the present invention to provide a construction of the above type with a means for adjusting the position of the anvil which engages the rear surface of the sawtooth during the upsetting thereof, so that in this way the structure of the invention can easily be adapted for use with sawteeth of different sizes.

Also, it is an object of the present invention to provide a structure which will distribute the wear of the upsetting rod axially along the length thereof, so that the upsetting rod will have a long, useful life.

Yet another object of the present invention is to provide a structure capable of clamping a sawtooth while it is worked on by the upsetting rod and also capable of redistributing the material of the sawtooth which has been upset, without, however, running any risk of undesirably bending the sawtooth.

Furthermore, it is an object of the present invention to provide a structure capable of adjusting the extent to which the material-distributing jaws move toward each other.

Primarily the structure of the present invention includes, in an apparatus for treating sawteeth, rotary upsetting rod which is provided for upsetting each tooth, when it is at a working station, at the cutting edge of the tooth and in the region of the tip thereof, and a moving means for moving the upsetting rod from a rest position into engagement with the cutting edge of the tooth, whereupon the upsetting rod itself is moved by the moving means through an additional increment required to displace the tooth to the working station, and in this way when the upsetting rod is in its operating position it will be in engagement with the tooth which is to be upset during the subsequent rotary movement of the upsetting rod. A material distributing means is provided for redistributing the material which is upset by the upsetting rod, and the moving means is operatively connected to this distributing means to displace the latter from a rest position to an operating position where the distributing means will engage and redistribute the material which has been upset by the upsetting rod. The material-distributing means acts on the tooth without any further displacement thereof from the working station after the upsetting rod has worked on the tooth.

*Brief description of the drawings*

The invention is illustrated by way of example in the accompanying drawings which form part of the application and in which:

FIG. 4a is a sectional elevation of a clamp-actuating structure;

FIGS. 6E–6H are respectively front, side, top and perspective views of a tooth after it is upset;

*Description of a preferred embodiment*

Figure 1:
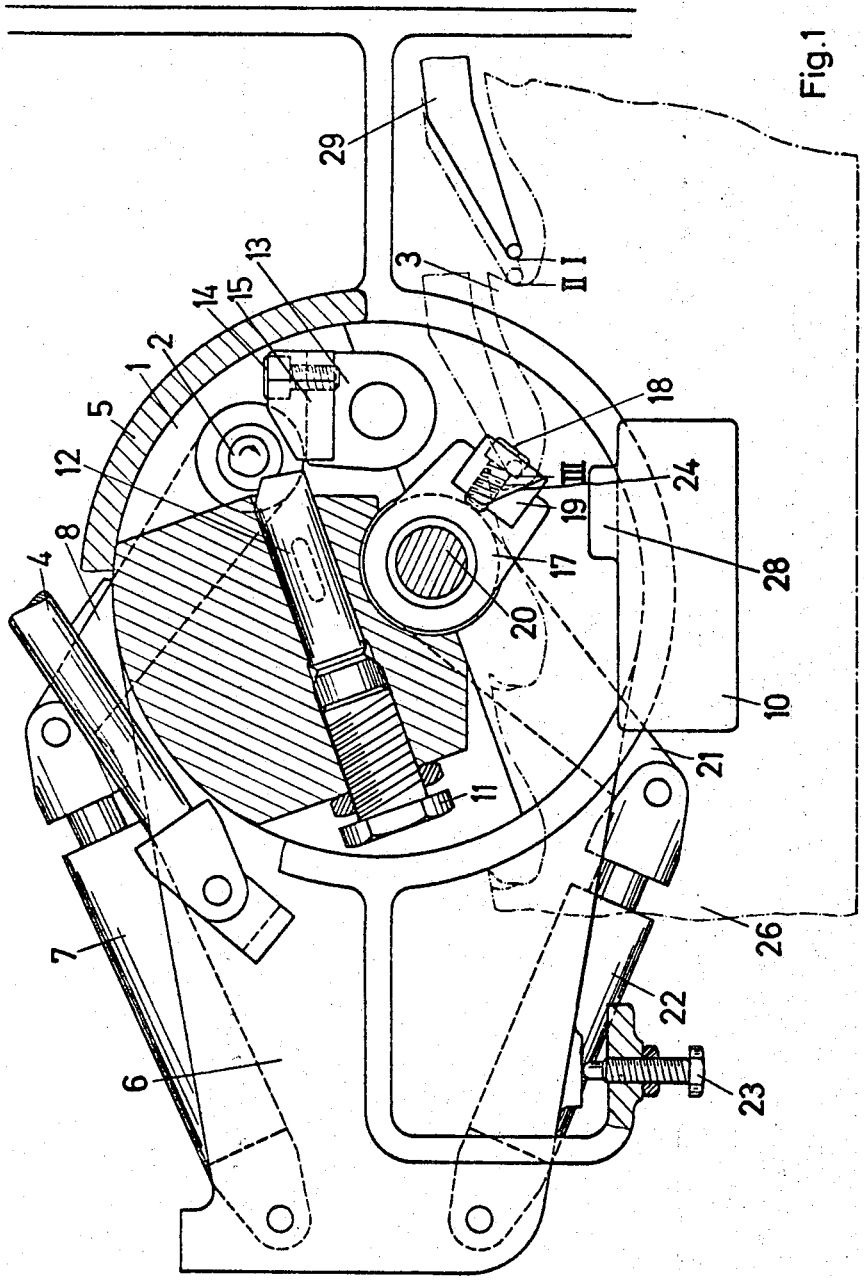
FIG. 1 is a schematic partly section side elevation of one possible structure according to the present invention, this structure being shown in one end position in FIG. 1.

The structure illustrated in the drawings includes a rotary moving means in the form of a tool-carrying structure 1 which is supported by a support means for rotary movement, this support means being formed by the frame 5 of the machine. The moving means 1 has the form of a cylindrical body, and the axis of the moving means 1 is perpendicular to the saw blade 26 which is fragmentarily indicated in dot-dash lines in FIGS. 1 and 2, the location of the blade 26 also being indicated in FIGS. 3 and 4. As is apparent from FIGS. 1 and 2, the axis of the rotary moving means 1 is situated at an elevation higher than the saw blade. The moving means 1 has a pair of substantially radially extending arms 6 fixed to and projecting therefrom, and a piston 4 of a hydraulic cylinder-and-piston assembly is pivotally connected at one end to one of the arms 6. The cylinder of this latter hydraulic assembly is pivotally connected to the frame 5, as indicated at the upper right corner of FIG. 2, so that the movement of the piston 4 with respect to the cylinder in which it slides will turn the moving means 1 between the end positions thereof respectively illustrated in FIGS. 1 and 2. During this turning of the moving means it rotates about its own axis.

Figure 2:
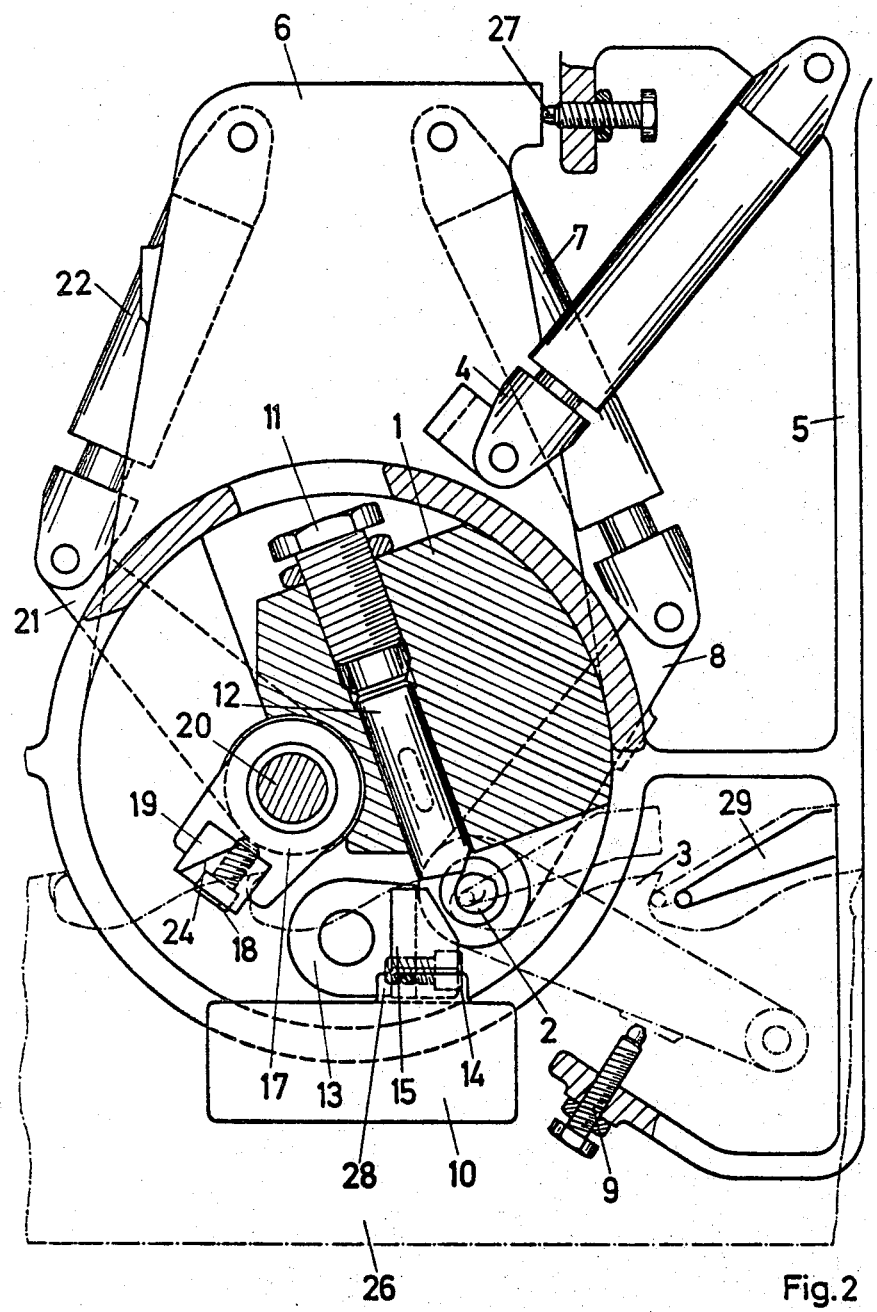
FIG. 2 is a schematic partly sectional elevation showing additional components of the structure and showing the parts of FIG. 1 in another end position.

In the end position shown in FIG. 1, a machined surface of the arm 6, shown in FIG. 1, engages an adjustable stop screw 23 carried by the frame 5 and forming one adjustable stop means for determining the end position of the moving means shown in FIG. 1, while in the end position shown in FIG. 2 a second machined surface of this arm 6 engages an adjustable stop screw 27 which is carried by the frame 5, so that the stop screw 27 forms a second adjustable stop means which functions to determine the end position of the parts shown in FIG. 2.

Figure 3:
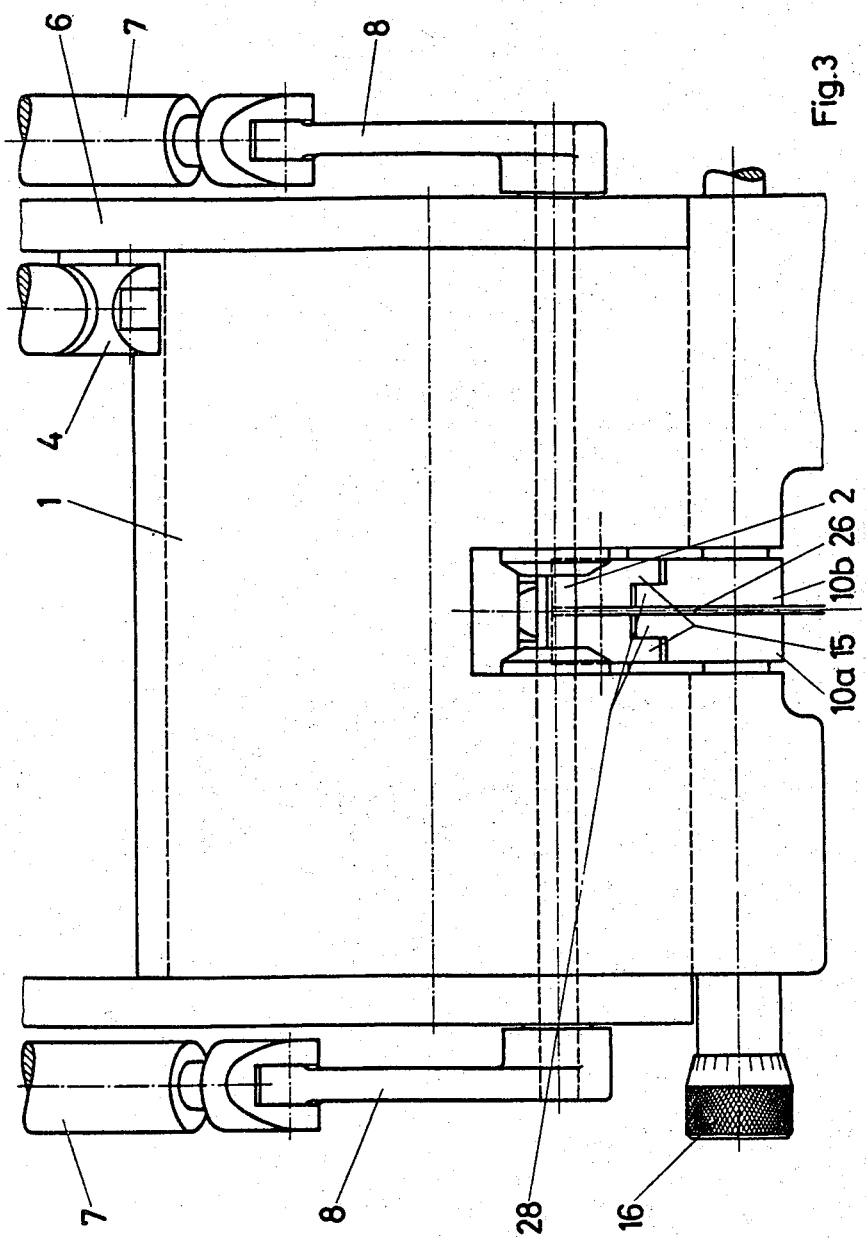
FIG. 3 is a schematic top plan view of the structure of FIGS. 1 and 2.

As is apparent from FIG. 3, the rotary cylindrical moving means 1 is formed with a cutout into which the blade 26 extends, this cutout being in the form of a slot situated in a radial plane which passes perpendicularly through the axis of the moving means 1. The upper toothed portion of the blade 26 extends into the cutout of the moving means 1. The tools which act on the saw blade are carried by the moving means 1 in the cutout thereof into which the saw blade extends, and these tools include an elongated rotary upsetting rod 2 which also extends perpendicularly to the saw blade. The body 1 is formed with an axial bore which is spaced from and parallel to the axis of the body 1 and which intersects the cutout which receives the blade 26, and the upsetting rod 2 extends through this bore of the body 1, the rod 2 having free ends which are respectively situated beyond the body 1, as is apparent from FIGS. 3 and 4. In addition, the part of the body 1 which is aligned with the slot thereof which receives the blade 26 is formed with a bore in which the anvil 12 is guided for longitudinal movement. A tooth-clamping means, which includes a pair of clamping jaws 15, is also situated in the cutout formed within the body of the moving means 1 so as to be capable of engaging each tooth of the saw blade when this tooth is at the working station, and in addition a material-distributing means which includes a pair of material-distributing jaws 19 is also situated in the cutout of the rotary body 1.

The elongated upetting rod 2 is supported adjacent its ends for rotary movement by the cylindrical body 1, and the free ends of the rod 2 are respectively fixed to a pair of aligned and identical levers 8 at free ends of the latter. These levers 8 are pivotally connected at their ends distant from the rod 2 to a pair of pistons which are respectively slidable in a pair of cylinders 7 of a hydraulic cylinder-and-piston assembly, and as is particularly apparent from FIGS. 3 and 4, there are a pair of the cylinders 7 which receive pistons which are respectively pivotally connected to the arms 8. FIG. 3, shows schematically how the ends of the body 1 are fixed with the pair of identical and aligned radial arms 6. The cylinders 7 are respectively pivotally connected to these arms 6, as is apparent from the schematic illustration in FIGS. 1 and 2. With this arrangement the turning force applied to the rotary upsetting rod 2 is applied to the latter simultaneously at the ends thereof, so that in this way the torsional stresses to which the rod 2 is subjected are maintained at a minimum. In addition, the arms 8 may be releasably fixed with the rod 2 through suitable set screws or the like which may be loosened so as to permit axially shifting of the rod 2 to different axial positions with respect to the arms 8 which can be releasably fixed to the rod 2 in a selected axial position of the rod 2 within a given range of axial positions, and thus the wear of the exterior surface of the rod 2 can be axially distributed along the rod 2.

Figure 4:
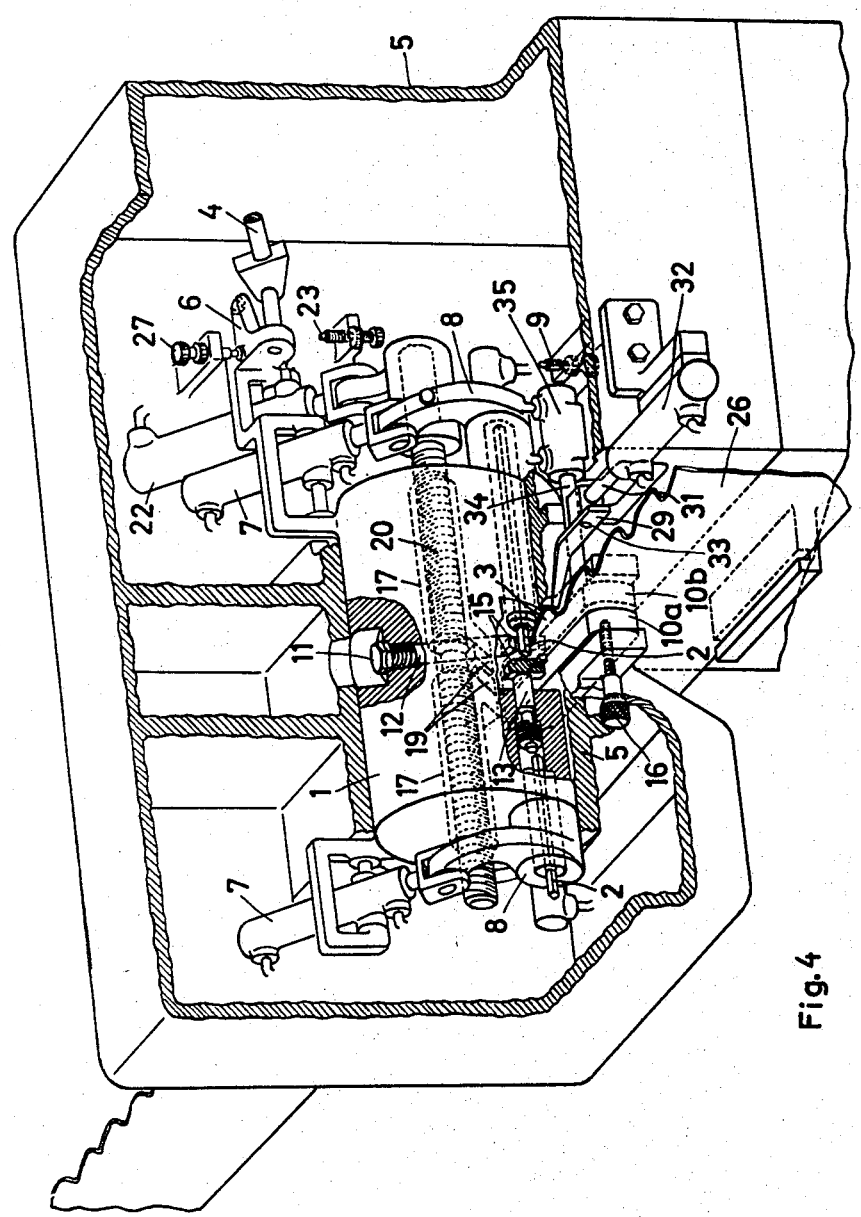
FIG. 4 is a partly sectional perspective illustration of one possible embodiment of an actual structure according to the present invention.
Figures 5A, 5B:
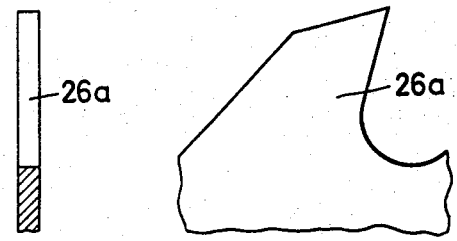
FIGS. 5A–5D are respectively front, side, top, and perspective illustration of a sawtooth before treatment thereof.
Figure 5C:
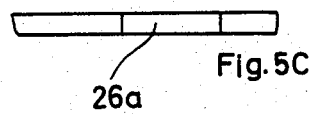
Figure 5D:
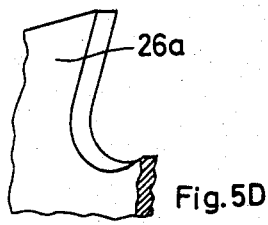
Figures 6A, 6B:
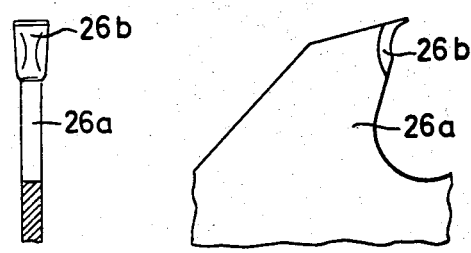
FIGS. 6A–6D are respectively front, side, top, and perspective illustrations of a sawtooth after treatment thereof according to the invention.
Figure 6C:
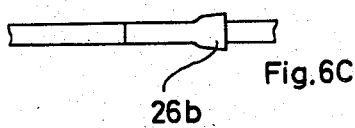
Figure 6D:
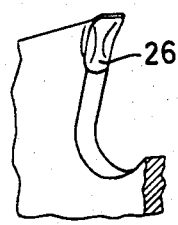

As is indicated in FIG. 4 and at the lower right of FIG. 2, an adjustable stop screw 9 is carried by the frame 5 to engage a machined surface of the right lever 8 of FIG. 4 so as to determine an end position thereof.

As is indicated from FIG. 2, the tooth-clamping jaws 15 are situated at such a distance from the rod 2 that in the end position of the moving means 1 which corresponds to the operative position of the upsetting rod 2, this being the position shown in FIG. 2, the jaws 15 are situated in the immediate vicinity of the tip of the tooth which is at the working station shown in FIG. 2, so that the tooth is reliably clamped between the jaws 15 during action of the upsetting rod 2 on the tooth, and thus any undesirable bending of the tooth is avoided by the action of the clamping jaws 15 thereon. These clamping jaws 15 are releasably connected by screws 14, respectively, to a pair of coaxial plungers 13 which are axially slidable in suitable bores formed in the body 1, as shown in section for the left jaw 15 of FIG. 4, and to which a fluid under pressure, such as a hydraulic fluid, can be applied for the purpose of advancing the plungers 13 toward each other so as to press the jaws 15 respectively against opposed faces of a tooth at the working station, and of course these plungers 13 can be retracted away from each other to displace the jaws 15 away from the tooth so as to release the latter. For example, as is indicated in FIG. 4a, after the blade 26 is clamped by the jaws 10a and 10b, the hydraulic structure transmits oil under pressure to the plungers 13 to urge them toward each other, so that the jaws 15 engage the saw blade 26 and the projections 28 of the clamping jaws 10a and 10b. After the upsetting of a tooth has been completed, the hydraulic structure is controlled to eliminate the pressure of the oil acting on the plungers 13 which are then retracted by the springs 13a while oil flows out of the cylinders 13b in which the plungers 13 are guided.

Figure 7:
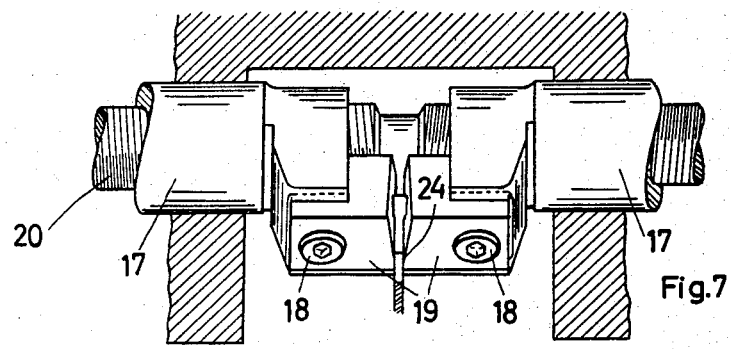
FIG. 7 is a partly sectional elevation of a material distributing means of the invention which distributes the upset material of the sawtooth.
Figure 8:
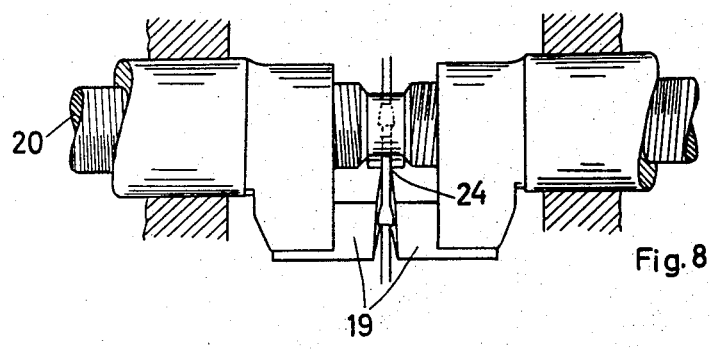
FIG. 8 is a top plan view of the structure of FIG. 7.

The pair of material-distributing jaws 19, which form the means for distributing the material which has been upset by the upsetting rod 2, are also respectively situated on opposite sides of the saw blade. These jaws 19 are releasably fixed by screws 18 to a pair of carrier members 17 (FIGS. 7 and 8) which are prevented from turning with respect to the body 1 and which are respectively formed with coaxial threaded bores which respectively threadedly receive threaded portions of a threaded spindle 20. The threaded spdinle 20 extends through an axial bore of the body 1 to be supported for rotary movement by the body 1, and in addition, the spindle 20 is axially adjustable in the body 1. This spindle 20 is formed along one half of its length with right-hand threads and along the other half of its length with left-hand threads, and it is these oppositely threaded portions which respectively cooperate with the threaded bores of the jaw-carrying elements 17, so that when the spindle 20 is turned in one direction the material-distributing jaws 19 will approach each other while when the spindle 20 is turned in an opposite direction the material-distributing jaws 19 will move apart from each other. The spindle 20 is fixed to one end of a lever 21 whose opposite end is pivotally connected with a piston which slides in a cylinder 22 which is pivotally carried by the right arm 6 of FIG. 4, so that the cylinder 22 and the piston therein form a hydraulic cylinder-and-piston assembly for turning the lever 21 first in one direction and then in an opposite direction so as to turn the spindle 20 in opposite directions. The jaws 19 respectively have inner inclined surfaces extending upwardly from their edges 24, as viewed in FIG. 1 for the jaw 19 which is illustrated therein, and these inclined surfaces at the inner sides of the jaws 19 are directed toward each other and diverge from other upwardly from the edges 24, as is particularly apparent from FIG. 7 which shows the jaws 19 as they appear when viewed from the right of the jaws 19 in FIG. 1. FIG. 8 also shows how these inner side surfaces of the jaws 19 diverge in an upward direction when the parts have the position of FIG. 1.

As may be seen from FIG. 2, in the operating position of the rotary upsetting rod 2, the anvil 12 is situated over the rod 2. This anvil 12, in addition to being guided for movement in a suitable guide bore of the body 1 is acted upon by an adjusting screw 11 which is threadedly carried by the body 1 and which is capable of adjusting the axial position of the anvil 12, a free end of the adjusting screw 11 extending outwardly beyond the body 1 into the slot thereof, as is apparent from FIGS. 1 and 2, so that in this way the adjusting screw 11 is accessible for adjusting the axial position of the anvil 12.

Beneath the body 1 is situated the normal blade-clamping means 10 which takes the form of a pair of blade-clamping jaws 10a and 10b respectively situated on opposite sides of the saw blade 26. As is shown in FIG. 4, a piston rod 34 which is slidable in a hydraulic cylinder 35 is fixed to that surface of the jaw 10b which is directed away from the jaw 10a, so that by controlling the flow of fluid in the cylinder 35 the piston 34 will be advanced and retracted to displace the jaw 10b toward and away from the jaw 10a.

The jaw 10a can be stationary while the jaw 10b is capable of moving toward and away from the jaw 10a. This jaw 10a can have its position with respect to the saw blade, in the interior of the cutout of the body 1, adjusted by way of a threaded screw 16 carrying a suitable scale. As is shown in FIG. 3, the blade-clamping jaws 10a and 10b have projections 28 at their upper ends, and these projections form stop surfaces engaged by the tooth-clamping jaws 15 when the latter are respectively urged to their tooth-clamping position by the plungers 13, so that in this way the stop surfaces formed by the portions 28 of the jaws 10a and 10b serve to limit the movement of the tooth-clamping jaws 15 toward each other to an extent which is in accordance with the thickness of the saw blade.

A feeding means is provided for feeding the teeth of the saw blade in a stepwise manner successively almost up to the working station at which is situated the tooth shown in FIG. 2 engaged by the rod 2 and the anvil 12. This feeding means takes the form of a pawl 29 pivotally carried by a suitable carriage which is longitudinally shiftable with respect to the blade 26, and this feeding means 29 is situated to the right of the body 1, as viewed in FIGS. 1 and 2. The pawl 29 is capable of dropping into the gap between a pair of teeth so as to engage a tooth 3 at its front cutting edge in order to shift the tooth 3 which it engages, and the entire saw blade therewith, in a direction opposite to that in which the saw blade 26 moves during actual cutting of material by the teeth 3 thereof. As may be seen from FIG. 4, the pawl 29 is pivotally carried by a pivot 33 fixed to one end of a piston rod 31 which at its other end is fixed to a piston which is slidable within a cylinder 32 carried by the frame 5, and by controlling the flow of hydraulic fluid to and from the cylinder 32 the pawl 29 can be advanced and retracted.

The above-described structure operates in the following manner:

Each tooth 26a of the blade 26 will initially have the construction shown in FIGS. 5A–5D. Thus, as may be seen from FIGS. 5A–5D, initially each tooth 26a is of a uniform thickness and has the configuration which is most clearly apparent from FIGS. 5B and 5D.

The rotary moving means 1 is shown in FIG. 1 in the end position it takes when the material equalizing jaws 19 are opened and the feeding pawl 29 is in its starting position I. This pawl 29 then moves from its starting position I to the left, as viewed in FIG. 1, to the position II, and in this way, the free end of the pawl 29 comes into engagement with the front cutting edge of the tooth 3 which is to be upset. This tooth 3, when the clamping jaws 10a and 10b are in their non-clamping position, is shifted by the pawl 29 during displacement of the latter from the position II into position III indicated in FIG. 1, and in this position the tooth 3 which is to be worked on has almost, but in fact not yet, reached the working station. When the pawl 29 is in position III, the tooth which is engaged by the pawl 29 must still move through a distance of approximately 1 or 2 mm. before reaching the working station where the tooth will be upset by the rotary upsetting rod 2. After reaching the position III, the feeding pawl 29 is retracted back toward its starting position, and in this way it rides over the rear edge of the succeeding tooth 3 and falls into the next gap between the teeth of the saw blade 26.

It is during this retraction of the pawl 29 that the rotary moving means 1 is acted upon by the piston 4 so as to turn from the end position of FIG. 1 into the end position of FIG. 2. As a result, the upsetting rod 2, the open tooth-clamping means 15, the open material-distributing means 19, and the anvil 12, all of which are carried by the body 1, are moved substantially in the feeding direction in which the saw blade is fed by the pawl 29. The material-distributing means 19 therefore becomes situated to the rear of the working station and the rotary upsetting rod 2 moves downwardly into the gap formerly occupied by the pawl 29 so as to engage the tooth 3 which was moved almost up to the working station by the feeding means 29.

Just before the rotary moving means 1 reaches the end position thereof shown in FIG. 2, the rod 2 will engage the cutting edge of the tooth 3 which is almost at the working station and will continue to advance the blade 26 through the slight additional distance required to situate the tooth 3 at the working station shown in FIG. 2, and at this time, the arm 6, shown in FIG. 2, will engage the adjustable stop 27, and of course the rotary upsetting rod 2 will be in engagement with the portion of the tooth 3 which is to be upset. The rotary movement of the moving means 1 automatically and simultaneously displaces the anvil 12 to the position where it engages the rear edge of the tooth which is at the working station.

The parts then have the position shown in FIGS. 2 and 4, and in this position the blade clamping means 10 is actuated to clamp the blade 26 so as to maintain the latter in the position shown in FIG. 2, and simultaneously the plungers 13 are acted upon so that the tooth-clamping means 15 engages the tooth 3, which is at the working station, at the opposite faces of the tooth and in the immediate vicinity of the tip thereof at the region where the tooth will be acted upon by this rotary upsetting rod 2. In this way, not only is the blade held stationary by the clamping means 10, but in addition the tooth at the working station is reliably prevented from bending undesirably as a result of the action of the upsetting means 2.

Now the hydraulic assembly which includes the cylinders 7 is actuated to turn the levers 8 in unison from the solid to the dot-dash line position indicated in FIG. 2, where these levers respectively engage the adjustable stop 9, and during this time the rod 2 will be turned in a clockwise direction, as viewed in FIG. 2, so that due to the non-circular cross sectional configuration of the upsetting portion of the rod 2, this rod 2 will deform and upset the material of the tooth 3 at the cutting edge thereof and in the region of the tip thereof. During the succeeding return of the upsetting rod 2 back to its initial angular position, by retraction of the pistons into the cylinders 7, respectively, the plungers 13 are retracted so as to withdraw the tooth-clamping jaws 15 away from each other, and in addition, the piston 4 is acted upon hydraulically so as to return the rotary moving means 1 back to the position shown in FIG. 1. In this position one of the arms 6 engages the adjustable stop 23, as shown in FIG. 1.

As soon as the moving means 1 has reached the end position shown in FIG. 1, the hydraulic assembly which includes the cylinder 22 is actuated so as to turn the spindle 20 and, thus, displace the material distributing jaws 19 toward each other. As may be seen from FIG. 1, in this position the jaws 19 are situated beside the upset portion of the tooth, and the movement of the jaws 19 toward each other causes the jaws to engage and redistribute the upset material of the tooth so as to provide the upset portion of the tooth with a predetermined thickness, width, and configuration. These jaws 19 are moved equally and oppositely with respect to each other so that in this case also there is no danger of undesirably bending the tooth. The screw 23 is adjustable for the purpose of determining the distribution of the upset tooth material by the jaws 19. Thus, as the screw 23 is displaced upwardly, as viewed in FIG. 1, the jaws 19 will have a lower elevation when the parts are in the position of FIG. 1, while as the screw 23 is displaced downwardly, the jaws 19 will have a higher elevation when the parts are in the position of FIG. 1, so that in this way the elevation of the jaws 19 with respect to the blade 26 can be adjusted to control the extent of taper of each sawtooth when the material thereof is distributed by the jaws 10. Thus, referring to FIGS. 6A–6D, it is apparent that after each tooth 3 has been upset it will have at its tip the construction 3 with the opposed inclined surfaces having the taper most clearly apparent from 6A, and the extent of this taper can be adjusted by way of the screw 23. FIGS. 6E–6H show various views of the tooth 3 after it has been upset but before it has the condition shown in FIGS. 6A–6D. Furthermore, the jaws 19 can have portions which respectively cooperate with stop surfaces of the jaws 10a and 10b, similar to or even identical with the stop surfaces provided by the projections 28 thereof, so that through this construction also the extent to which the material-distributing jaws can approach each other is reliably limited, and undesirable bending of the sawtooth is reliably avoided in the same way as with the clamping jaws 15.

After the jaws 19 have reached the end of their compressing strokes during which they approach each other, they are automatically moved apart from each other and the clamping jaws 10 are also automatically acted upon to release the blade 26, so that now the feeding means 29 can again be actuated, and the above operations can be repeated on the next tooth of the saw blade.

Of course, the various hydraulic assemblies can be interconnected through suitable conduits with a source of fluid under pressure, and various valves can be provided to be acted upon either manually or through a suitable automatic structure, such as a suitable camming arrangement, for acting upon the valves in a sequence which will automatically provide the above-described sequence for operations.

What is claimed is:

1. In a saw treating apparatus, a rotary upsetting rod extending perpendicularly to a saw blade for engaging a sawtooth at a working station at the cutting edge of said sawtooth for upsetting the sawtooth in the region of its cutting edge during rotary movement of said rod, moving means operatively connected to said rod for moving the latter from a rest position into engagement with the cutting edge of a sawtooth, distributing means for redistributing the material of said sawtooth which has been upset by said rod, said distributing means having a rest position displaced from said working station and said moving means being operatively connected to said distributing means for displacing the latter to said working station from said rest position of said distributing means, said distributing means engaging the material upset by said rod to redistribute said material while each tooth remains at said working station subsequent to upsetting of each tooth by said rod, and support means supporting said moving means for rotary movement about an axis perpendicular to the saw blade, said moving means carrying said rod and said distributing means and turning in one direction to displace said rod to said working station and said distributing means to said rest position thereof away from said working station and in an opposite direction to displace said rod away from said working station back to said rest position thereof and to simultaneously displace said distributing means to said working station.

2. In an apparatus as recited in claim 1, blade clamping means releasably engaging said saw blade to hold the latter with a tooth thereof situated at said working station, and tooth clamping means engaging said tooth at said working station in the immediate vicinity of the tip of said tooth during the upsetting thereof by said upsetting rod, for holding said tooth while said upsetting rod acts on the latter.

3. In an apparatus as recited in claim 1, said moving means being a cylindrical body formed with a cutout into which said saw blade extends and in which tools for acting on said saw blade are situated.

4. In an apparatus as recited in claim 1, an anvil carried by said moving means for engaging the rear edge of the tooth at said station during action of said upsetting rod on said tooth, and adjusting means carried by said moving means and acting on said anvil for adjusting the position thereof.

5. In an apparatus as recited in claim 1, said upsetting rod being axially shiftable for distributing the wear of said rod axially along the latter.

6. In an apparatus as recited in claim 1, said distributing means including a pair of distributing jaws for engaging and distributing the upset material of the sawtooth during movement of said jaws relative to the sawtooth, said jaws respectively having coaxial oppositely threaded openings passing therethrough, and a rotary spindle extending through the latter openings and having oppositely threaded portions in threaded engagement with the threads of said openings so that when said spindle is turned in one direction said jaws will move toward each other while when said spindle is turned in an opposite direction said jaws will move away from each other.

7. In an apparatus as recited in claim 1, blade clamping means for releasably clamping the blade to hold the latter in a position where a tooth thereof is situated at said working station, and tooth clamping means for releasably engaging the tooth in the vicinity of a tip thereof during upsetting of the tooth by said rod so as to hold the tooth stationary during action of said upsetting rod thereon, each of said clamping means including a pair of clamping jaws, and the jaws of said blade clamping means having stop surfaces which cooperate with the jaws of said tooth clamping means to limit the extent to which the latter jaws approach each other.

8. In an apparatus as recited in claim 1, said upsetting rod having a pair of free ends, a pair of levers respectively fixed to said free ends of said rod, and a pair of hydraulic means respectively connected to said levers for turning the latter so that the force which rotates said rod acts on the latter simultaneously at the ends thereof, so as to subject the upsetting rod to relatively low torsional stresses.

9. In an apparatus as recited in claim 1, said moving means displacing said rod to an operating position where said rod after engaging the cutting edge of a sawtooth completes the movement of the tooth to said working station.

References Cited

UNITED STATES PATENTS

| | | | |
|---|---|---|---|
| 447,111 | 2/1891 | Hanson | 76—49 |
| 956,915 | 5/1910 | White | 76—49 |
| 1,824,349 | 9/1931 | Horton et al. | 76—54 |
| 2,800,039 | 7/1957 | Vollmer | 76—54 |

GRANVILLE Y. CUSTER, JR., *Primary Examiner.*

U.S. Cl. X.R.

76—52, 54